May 8, 1951 A. HORVATH 2,552,043
DEVICE FOR STRETCHING AND/OR FORMING THE RIMS OF SPECTACLES
Filed Feb. 21, 1948 2 Sheets-Sheet 1
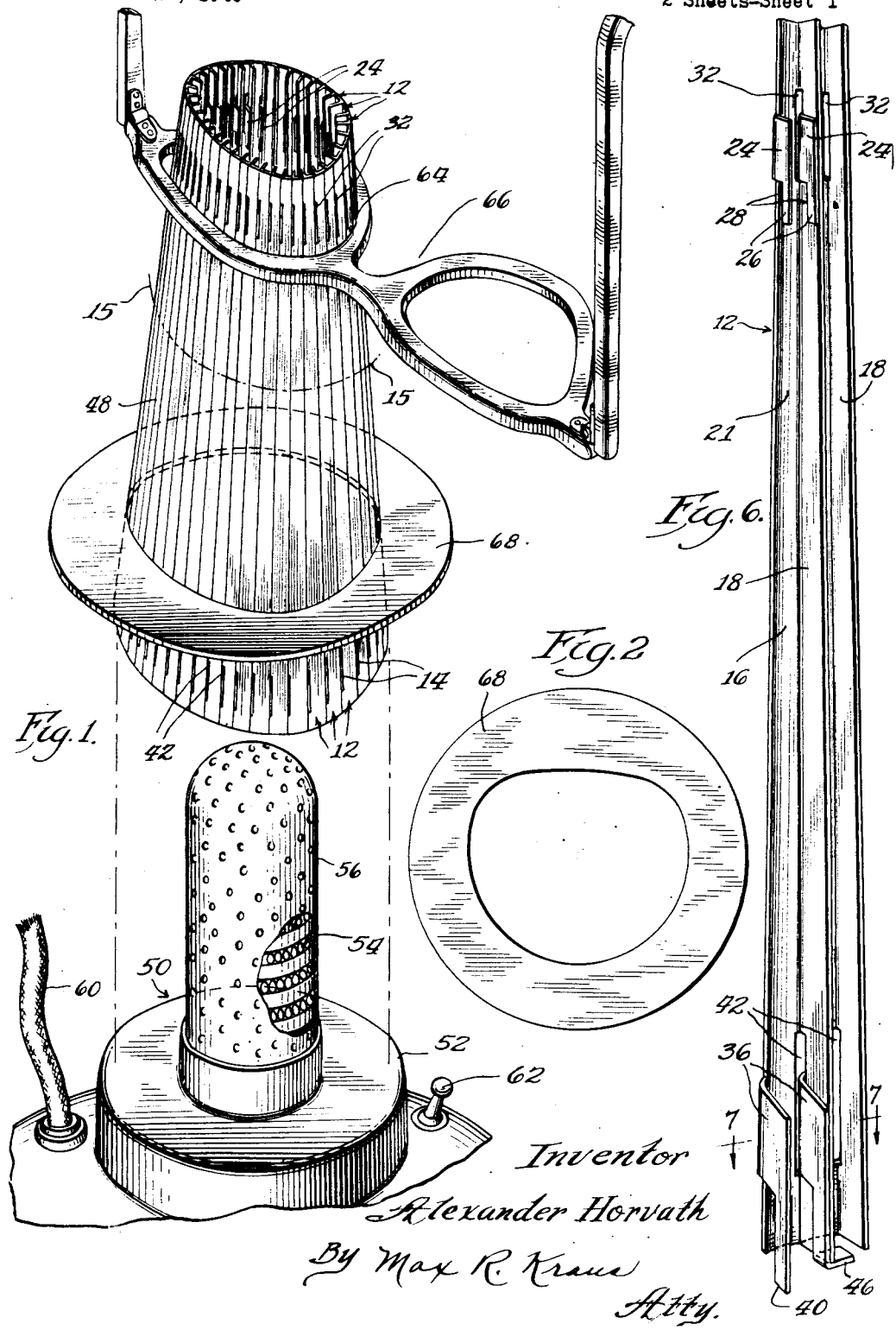
Inventor
Alexander Horvath
By Max R. Kraus
Atty.

May 8, 1951   A. HORVATH   2,552,043
DEVICE FOR STRETCHING AND/OR FORMING THE RIMS OF SPECTACLES
Filed Feb. 21, 1948   2 Sheets-Sheet 2
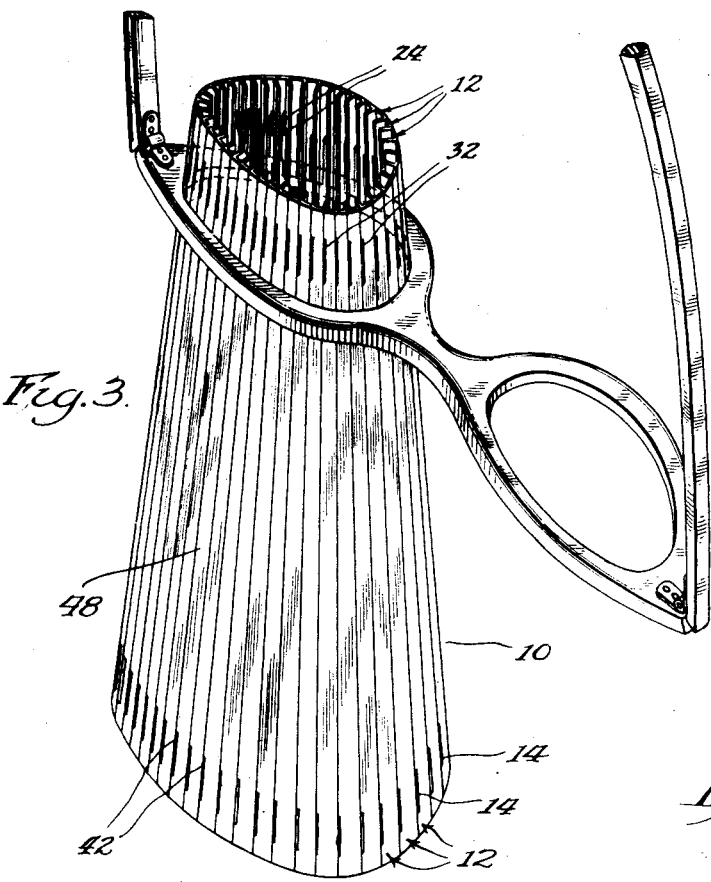
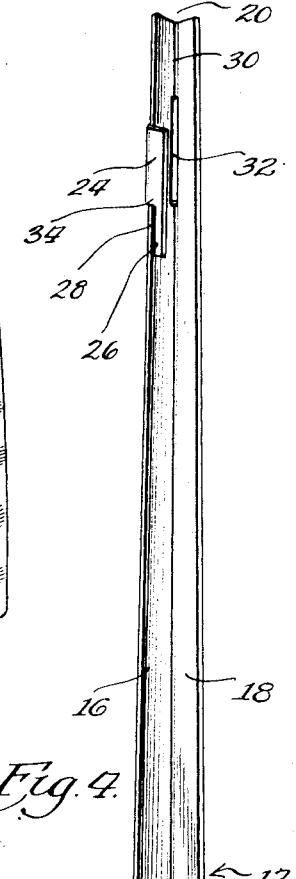
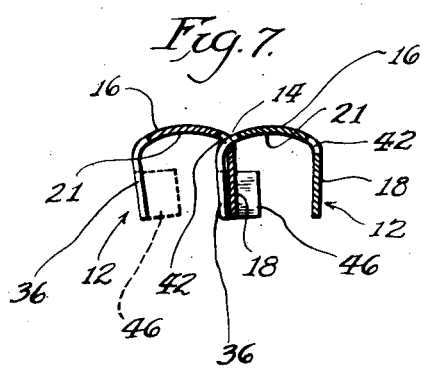
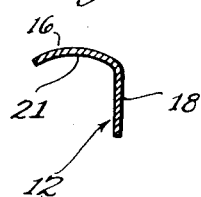
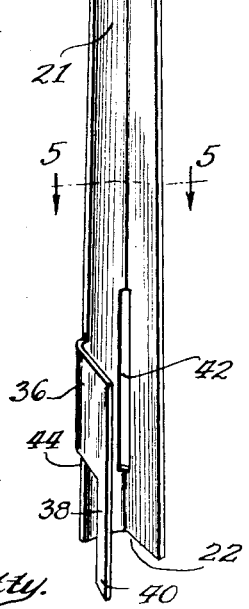
Inventor
Alexander Horvath
By Max R. Kraus
Atty.

Patented May 8, 1951

2,552,043

UNITED STATES PATENT OFFICE 2,552,043

DEVICE FOR STRETCHING AND/OR FORMING THE RIMS OF SPECTACLES

Alexander Horvath, Chicago, Ill.

Application February 21, 1948, Serial No. 10,074

7 Claims. (Cl. 81—3.5)

This invention relates to a device for stretching and/or forming the rims of spectacles.

One of the objects of this invention is to provide a device for use with plastic frames of spectacles which may be used to stretch the rims of the frame to accommodate any size and any shape lens, or to reshape the rims of the frame without the need of having at hand each of the various shaped molds.

Optical houses and shops who fit and sell spectacles find it necessary to maintain a number and variety of rim stretchers, that is, one for each shape, as well as lefts and rights of the frame. In addition to the cost, considerable time is entailed by the operator in selecting or changing to the proper shape of rim stretcher desired on which the frame is formed or stretched.

With my invention this is all eliminated as I provide a single device which assumes the shape of the rim frame when the frame is slid thereon, and permits stretching of the rim to any size. This device by the use of a pattern, permits reshaping of the rims of the frame and permits same to be simultaneously enlarged to any desired size. Therefore, an object of my invention is to provide a unit with which shaping and stretching to size of rims of spectacles may be done quickly and economically.

In the drawings:

Fig. 1 is an exploded view showing in perspective my device used in connection with a heating element, and the manner of reshaping the rims of frames of spectacles.

Fig. 2 is a top view of a pattern used for reshapings with my device.

Fig. 3 is a perspective view of my device showing its use for enlarging the rims of a frame.

Fig. 4 is an enlarged perspective view of an individual segment or rib.

Fig. 5 is a cross sectional view taken on line 5—5 of Fig. 4.

Fig. 6 is an enlarged perspective view showing two segments secured together in the same manner that the remaining segments would be secured to form the continuous wall of the device, and Fig. 7 is a cross sectional view taken on line 7—7 of Fig. 6.

The device 10 is formed so that in general outline it assumes the shape of a truncated cone. The cone generally is formed of a plurality of segments or ribs 12 interlaced or interlocked together as at 14 to form a continuous wall and providing a pivoted or hinged connection between each segment or rib to permit the cone to be sufficiently flexible on its transverse cross section, indicated at 15—15, so that it can be reshaped transversely. All the segments 12 are identically formed and identically interlocked and a description of one will suffice. The rib or segment 12 is an elongated member having an adjoining front wall 16 and side wall 18 positioned at right angles to each other. The front wall gradually tapers outwardly from the top 20 to the bottom 22 and the measurement of the front wall at the top is about two-thirds of the measurement at the bottom. The front wall is curved on its transverse cross section as at 21, best shown in Fig. 5. Spaced from the top of the front wall is an inverted L shaped extension 24 which is formed at right angles to the front wall 16 and is substantially parallel to the side wall 18. Between the leg 26 of the extension and the front wall 16 there is a space 28 which permits interlocking of the segments as will presently be described.

Along the juncture 30 of the adjoining front and side walls there is an elongated slot 32 which extends from above the extension 24 to approximately the level of the horizontal line 34 of the extension. Adjacent the bottom of the segment, I provide another L shaped extension 36 similar to that previously described, with the leg portion 38 extending slightly below the level of the side walls as at 40. The juncture of the walls is likewise provided with an elongated slot 42, the top of the slot extending above the level of the top of the extension and the bottom of the slot being substantially level with the horizontal line 44 of the extension.

The segments 12 are positioned adjacent each other and interlocked, as best shown in Fig. 6. To interlace adjoining segments the bottom L-shaped extension 36 is inserted in the slot 42 of the adjacent segment and the top L-shaped extension 24 is then inserted in the slot 32 of the adjacent segment. In this condition there is a vertical play between adjoining segments. The adjoining segments are then positioned so that the tops of each are on the same horizontal plane and that portion 40 of the bottom leg 38 which extends below the bottom of the adjoining side is bent at right angles, as at 46, to engage the underside of the side wall 18 and prevent any vertical movement between adjoining segments, thus locking the segments to each other to form a continuous wall 48. An inward hinging or pivotal connection is provided between adjacent segments to permit the wall 48 of the cone to be sufficiently flexible to permit its reshaping transversely to assume any shape that may be necessary by virtue of the shape of the rims of the frame. As will be apparent, the side walls 18 of the segments 12 extend longitudinally in spaced relation, and serve as rigidifying elements on the inner face of the conical wall to render the said wall longitudinally rigid but radially deformable.

The cone automatically takes on the shape of the rim of the frame placed upon it.

My device is to be used in connection with a conventional heating unit generally indicated at 50 and illustrated in Fig. 1. The heating unit comprises a base 52 which contains the conventional threaded socket into which is screwed the heating element 54. The heating element is covered by a shield 56 having apertures 58. The socket in turn is connected by a conducting wire 60 to a suitable electrical outlet for supplying electric current. A switch 62 operates the heating unit. My flexible cone is positioned on the base 52 and surrounds the heating element 58 and is heated by the heating element. When the cone is heated, the rim 64 of the frame 66 is positioned on the cone and the frame is moved downwardly, the cone body or wall 48 automatically adjusting itself to the shape of the rim 64. The frame is moved down on the cone as far as it is desired to expand and/or stretch the rim. The heated cone will stretch the rim uniformly in its preformed shape. When the rim has been expanded to the required size, the operator removes the frame from the cone, inserts the lens in the rim and places it in water to cool, allowing the rim to contract and tightly secure the lens in the frame.

Heretofore it has been necessary to provide different shaped forming rim stretchers for reshaping the rims of frames to accommodate other styles or shapes of lens, consequently requiring a number of such rim stretchers to fit the variety of such styles. With my invention this is eliminated as my cone can be reshaped by using a pattern 68, or the like. Since the wall of the cone is flexible and will accommodate itself to reshaping, a pattern having a cutout shaped similar to the rim of the frame is slid over the top of the cone and down as far as possible until it wedges on the cone, the cone automatically assuming the shape of the pattern. The cone will be maintained in such fixed shape until the pattern is removed. With the cone in preshaped form, any style rim frame is inserted on the cone and is pushed downwardly thereon until the rim of the frame is reshaped to the shape of the cone. The size of the reshaped rim being determined by the position it is pushed down on the cone. With this arrangement all that is required with the cone is a single pattern for each of the various styles of rims, as the sizes can be formed on the cone, as previously described. While I have shown only one pattern 68, it will be obvious that other shaped patterns with cutouts shaped to conform to the various styles of rims can be used. The same pattern is used for the right and left rims of a frame by turning the pattern over and thus inserting it on the cone. The term plastic includes materials from which spectacle frames are conventionally made, for example, Celluloid, lucite, plastic glass, etc.

Various changes and modifications can be made without departing from the spirit and scope of my invention.

I claim:

1. A device for stretching or reshaping spectacle rims, comprising a substantially conical structure having a flexible continuous wall and a plurality of spaced longitudinally extending rigidifying elements on the inner face of said wall whereby said wall is longitudinally rigid but radially deformable.

2. A device for stretching or reshaping spectacle rims, comprising a substantially conical structure having a flexible continuous wall and a plurality of spaced longitudinally extending rigidifying elements on the inner face of said wall and formed integrally therewith whereby said wall is longitudinally rigid but radially deformable.

3. A device for stretching or reshaping spectacle rims, comprising a substantially conical structure having a flexible continuous wall and a plurality of spaced longitudinally extending rigidifying elements on the inner face of said wall whereby said wall is longitudinally rigid but radially deformable, and a rigid pattern corresponding to the desired shape of the spectacle rims and engaging the wall of said structure to deform said wall radially to cause the same to conform to said pattern.

4. A device for stretching or reshaping spectacle rims, comprising a substantially conical structure having a flexible continuous wall and a plurality of spaced longitudinally extending rigidifying elements on the inner face of said wall and formed integrally therewith whereby said wall is longitudinally rigid but radially deformable, and a rigid pattern corresponding to the desired shape of the spectacle rims and engaging the wall of said structure to deform said wall radially to cause the same to conform to said pattern.

5. A device for stretching or reshaping spectacle rims, comprising a substantially conical structure formed of a plurality of elongated elements with adjacent elements hinged connected to each other to form a continuous flexible wall, and longitudinally extending reinforcing means on said wall whereby said wall is longitudinally rigid but radially deformable.

6. A device for stretching or reshaping spectacle rims comprising a substantially conical structure formed of a plurality of elongated elements interlocked along adjacent edges to permit hinged movement therebetween and forming a continuous flexible wall, and longitudinally extending reinforcing means on said elements whereby said wall is longitudinally rigid but radially deformable.

7. A device for stretching or reshaping spectacle rims comprising a substantially conical structure formed of a plurality of elongated elements interlocked along adjacent edges to permit hinged movement therebetween and forming a continuous flexible wall, longitudinally extending reinforcing means on said elements whereby said wall is longitudinally rigid but radially deformable, and a rigid pattern corresponding to the desired shape of the spectacle rims and engaging the wall of said structure to deform said wall radially to cause the same to conform to said pattern.

ALEXANDER HORVATH.

REFERENCES CITED

The following references are of record in the file of this patent:

UNITED STATES PATENTS

| Number | Name | Date |
|---|---|---|
| 386,955 | Beckerle | July 31, 1888 |
| 1,017,009 | McKinless | Feb. 13, 1912 |
| 1,523,530 | Hupman | Jan. 20, 1925 |
| 1,609,110 | Brown | Nov. 30, 1926 |
| 1,674,575 | Stead | June 19, 1928 |
| 1,685,167 | Ljunglof | Sept. 25, 1928 |
| 2,163,989 | Sturtz | June 27, 1939 |